May 26, 1959  J. G. HAWLEY  2,887,961
PUMP FOR WATER COOLED BRAKES
Filed Jan. 30, 1956  3 Sheets-Sheet 1

INVENTOR.
JESSE G. HAWLEY
BY
R. L. Miller
ATTORNEY

INVENTOR.
JESSE G. HAWLEY

INVENTOR.
JESSE G. HAWLEY

United States Patent Office 2,887,961
Patented May 26, 1959

2,887,961
PUMP FOR WATER COOLED BRAKES

Jesse G. Hawley, Penn Yan, N.Y., assignor to The Goodyear Tire & Rubber Company, Akron, Ohio, a corporation of Ohio Application January 30, 1956, Serial No. 562,166

5 Claims. (Cl. 103—187)

This invention relates to water cooled brakes in which a fluid, such as water, is supplied to the brake shoes to cool them, and especially to pump means for supplying the fluid under pressure.

It is an object of the present invention to provide a pump which will be operated by rotation of the wheel being braked for boosting the pressure of the cooling liquid.

It is a further object of the invention to provide a double acting pump for the purpose of providing constant pressure.

Other objects are to provide simplicity of structure, compact construction and positive action.

These and other objects will appear from the following description and the accompanying drawings.

Figure 1:
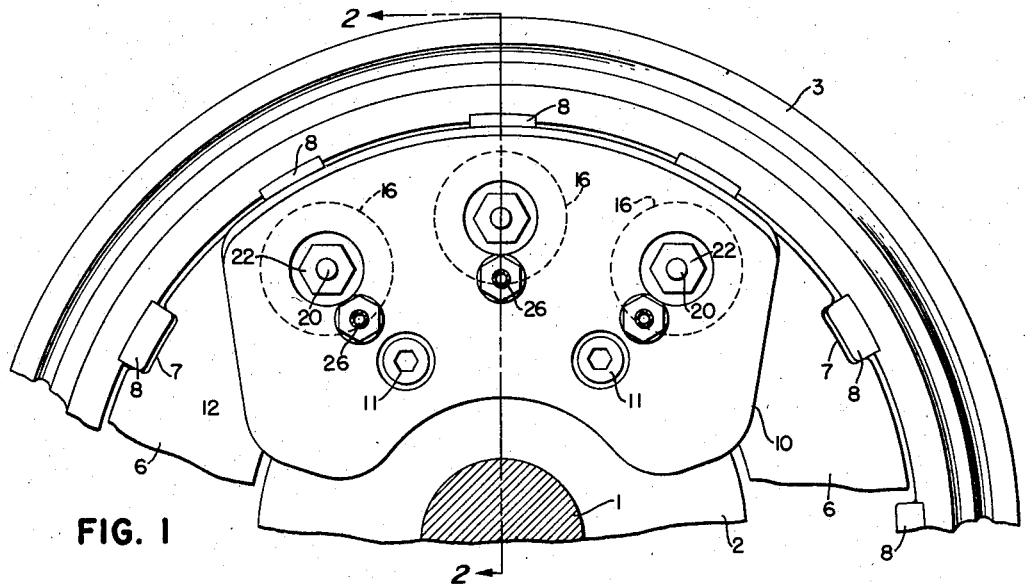
Fig. 1 is a face view of the inboard face of the wheel and brake, only the upper half of the wheel and brake being shown, the axle being shown in section.
Figure 3:
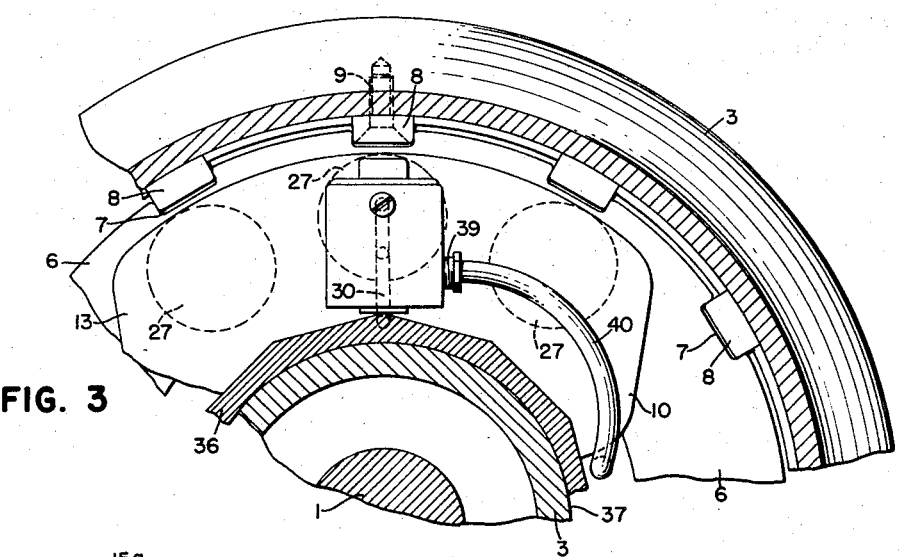
Fig. 3 is a cross-sectional view taken on line 3—3 of Fig. 2.
Figure 4:
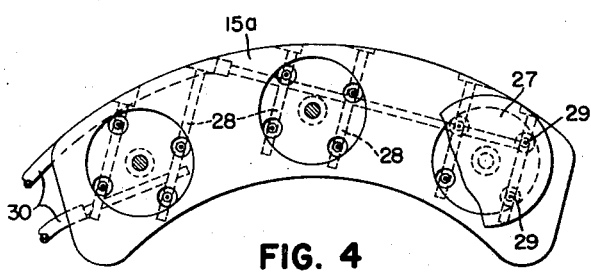
Fig. 4 is a face view of one of the brake shoes.
Figure 2:
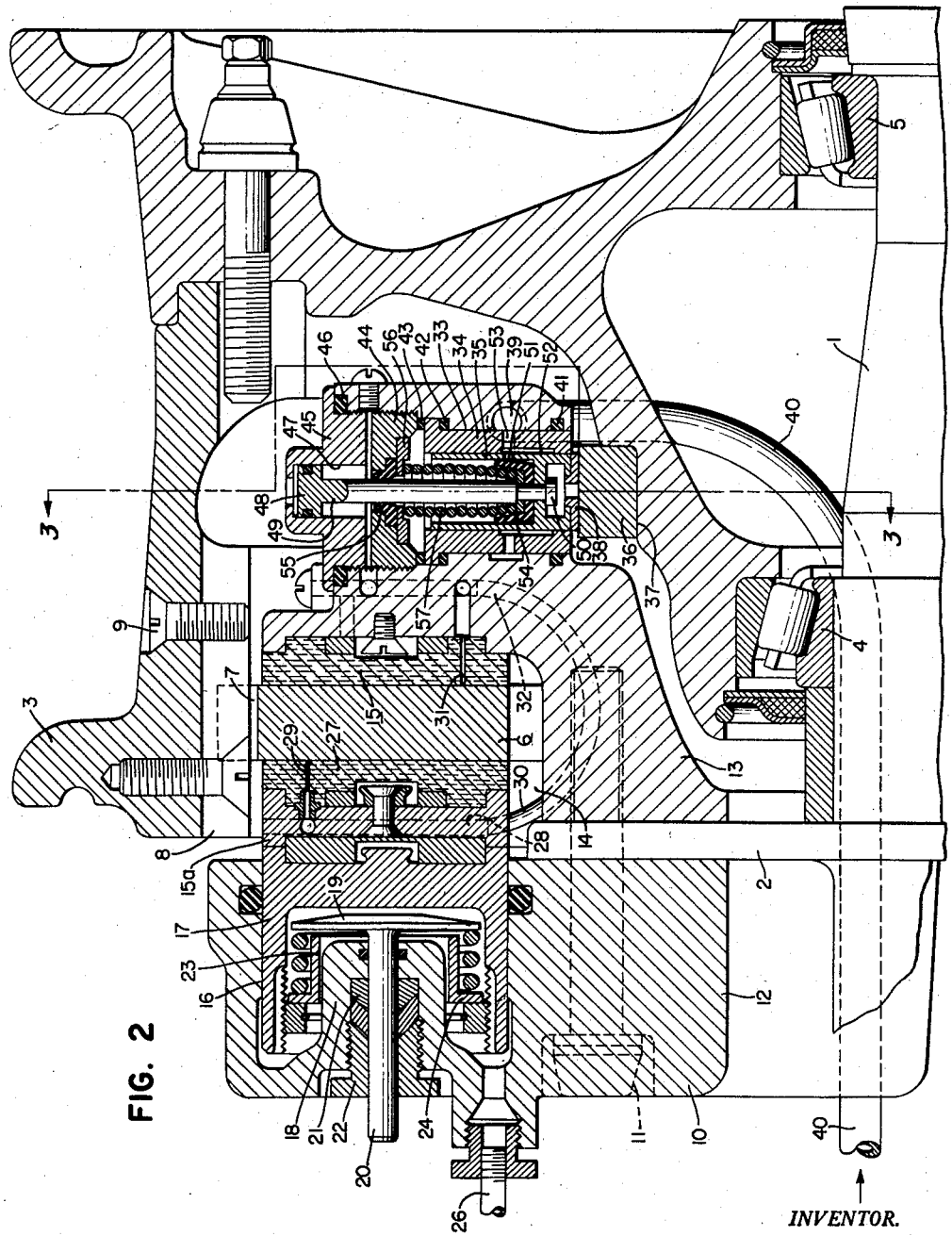
Fig. 2 is an axial cross-section thereof taken on line 2—2 of Fig. 1.
Figure 5:
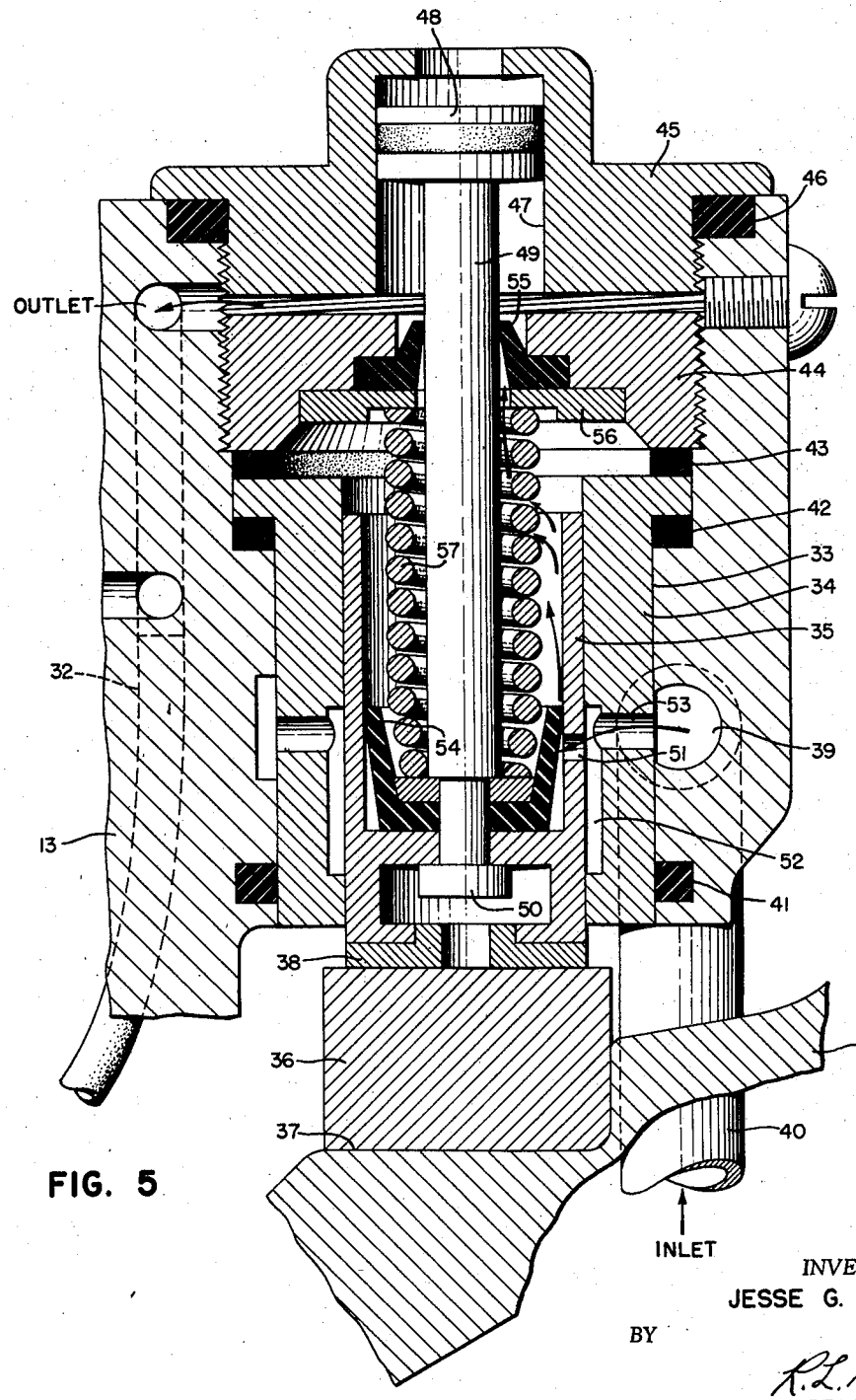
Fig. 5 is an enlarged sectional view of the pump mechanism taken on line 2—2 of Fig. 1, the wheel and brake being broken away.

Referring to the drawings, the numeral 1 designates a non-rotatable axle having a radial flange 2. A wheel 3 is rotatably mounted on bearings 4, 5 and has an annular brake disc 6 rotatable with the wheel but free to move axially thereof. For this purpose, the brake disc 6 has notches 7 thereabout for receiving keys 8 secured to the wheel rim by screws 9.

A non-rotatable brake member 10 is secured to the flange 2 of the axle by bolts 11 and is conveniently formed of two members 12 and 13 defining therebetween a groove 14 for clearing the brake disc 6.

The member 13 extends between the disc 6 and the web structure of the wheel 3 and has an arcuate brake shoe 15 mounted thereon and facing the brake disc.

The opposite member 12 is formed with a plurality of brake operating cylinders 16 in which are slidably mounted pistons 17 which as a group support a second brake shoe 15a movable by the pistons toward the brake disc 6.

While the cylinders 16 and pistons 17 may be of any desired type operated by fluid under pressure, it is preferred to have these of the type in which brake clearance is automatically maintained within close limits. For this purpose, for example, the member 12 may be formed to provide an inwardly extending sleeve 18 coaxial with the cylinder. A disc 19 is formed on the end of a rod 20 which extends axially of sleeve 18 and through a compressible friction collar 21 secured within the sleeve 18 by a gland nut 22. A shouldered sleeve 23 has an outwardly directed flange 24, threaded to engage internal threads of the skirt of the piston 17. The sleeve acts as a stop for engaging the disc 19 during forward movement of the piston. A coil spring 25 extends between disc 19 and flange 24 to return the piston. The arrangement is such that should sleeve 23 engage disc 19 before the brake shoe engages brake disc 6, disc 19 will be moved by slipping through the friction collar 21, to a new position restoring the desired brake clearance.

The cylinders 16 are all connected to a single source of pressure fluid for forcing their pistons forward. For this purpose, a pipe connection 26 is provided at each cylinder.

The brake shoe 15a may be of metal having a brake facing 27 secured to its face and made of molded asbestos or similar friction material.

For cooling the brake shoe 15a, a number of connecting passages 28 are formed therein and are connected by vent openings 29 through the facing 27 to the disc-engaging face thereof. All of the passages 28 are connected to a flexible tube 30.

Brake shoe 15 is also provided with vent openings 31 in its disc-engaging face and these vents connect with passages 32 formed in the member 13.

For supplying cooling liquid, such as water, to the brake shoes, a pump 33 is formed in the brake member 13, the pump cylinder 34 has a piston 35 fitted therein for sliding movement radial of the wheel. A cam 36 is mounted on a shoulder 37 of the wheel 3 and is adapted to provide reciprocating movement of the piston by contact of a cam follower 38 on the piston with an undulating face of the cam ring.

The cylinder 34 is mounted in a bore formed in the brake support member 13 which communicates with a port 39 connected by a pipe 40 to a supply of liquid. The cylinder 34 is sealed to the member 13 by an O-ring 41 and gaskets 42, 43. A centrally apertured threaded plug 44 engages threads of the bore of the member 13 to compress the gaskets. A threaded cap 45 also engages the threaded bore of the member 13 and seals it by compressing gasket 46. Cap 45 and plug 44 are spaced apart to provide a delivery space therebetween which communicates with passages 28 and 32. Cap 45 has a cylinder 47 formed therein coaxial with cylinder 34. A piston 48 is slidably mounted in cylinder 47' and has a piston rod 49 secured to piston 35 by a screw 50. The arrangement is such that the two pistons move in tandem.

A port 51 through the skirt of piston 35 communicates with inlet 39 at all positions of piston 35 by virtue of a connecting groove 52 and port 53 through the wall of cylinder 34. A cup gasket 54 within piston 35 acts to seal off the port 51 during an outward movement of piston 35 but to permit flow of liquid past its lip into the cylinder space outward of the piston 35 during a return stroke.

A lip gasket 55 is mounted on the plug 44 and is held in place by a collar 56. Its lip surrounds the piston rod 49 and permits flow outwardly along the rod but prevents return flow. A compression coil spring 57 is mounted about piston rod 49 with one end seated on piston 35 and the other end on collar 56. The spring holds the cam follower 38 against the cam 36.

Cylinder 47 is in communication with the outlet ports 28 and 32 at all times so that as spring 57 returns the piston in a radial inward direction piston 48 will force liquid in cylinder 47 to the outlet ports. The piston 48 has about one half of the effective area of piston 35.

As the brake shoe 15a is movable relative to the brake shoe 15, the passage 28 is connected to the passage 32 by a flexible tube connection 30 arranged to clear the brake disc 6 and other moving parts.

In the operation of the apparatus, water or other cooling liquid under pressure is supplied through pipe 40 to the port 39 of the pump and through passages 51 and 52 to the interior of the cylinder 34 outwardly of piston 35 by deflection of the lip of cup gasket 54. The line pressure in pipe 40 is normally low enough that the liquid cannot flow past lip gasket 55 to passages 28 and 32. As the wheel rotates, however, the cam 36 engages the cam follower 38 forcing piston 35 radially outward. This compresses liquid in cylinder 34 and forces it past the lip gasket 55 to passages 28 and 32 and also into cylinder 47. As cam follower 38 drops off the rise of cam 36, spring 57 returns pistons 35 and 48 to a radial inward position and piston 48 on this return stroke forces liquid to passages 28 and 32 so that a double acting pumping action is provided.

While a certain representative embodiment and details have been shown for the purpose of illustrating the invention, it will be apparent to those skilled in this art that various changes and modifications may be made therein without departing from the spirit or scope of the invention.

I claim:

1. A pump for supplying cooling liquid under pressure to a brake, said pump comprising a chamber, a lip gasket fixed to said chamber and separating said chamber into two cylinder spaces, a pair of pistons, one in each cylinder space and connected in tandem by a rod passing through said lip gasket, valve means carried by one of said pistons and permitting passage of liquid to said one of said cylinders, cam means intermittently engageable with an end of said rod for moving said pistons in one direction and thereby compressing liquid in said one cylinder and forcing it past said lip gasket to the other cylinder, and rod biasing means for returning said pistons and thereby forcing liquid from the other cylinder.

2. A pump for supplying cooling liquid under pressure to a brake, said pump comprising a chamber, an annular lip gasket fixed to said chamber providing a partition dividing the chamber into two cylinders, a pair of pistons separated by a connecting rod, one piston being in each cylinder, a one-way valved inlet to the first cylinder, an outlet from the second cylinder, a cam intermittently engageable with said connecting rod and operating to force liquid in said first cylinder past said lip gasket to said second cylinder and said outlet, and a spring engaging said rod and biasing said pistons to return them toward said cam while continuing to force liquid from said second cylinder to said outlet.

3. A pump for supplying cooling liquid under pressure to a brake, said pump comprising a pair of axially aligned cylinders, a pair of pistons slidably mounted within the respective cylinders and connected by a piston rod, a lip gasket about said rod and separating one cylinder from the other but permitting flow from cylinder to cylinder in one direction only along said rod, a delivery passage for escape of liquid from the cylinder toward which flow is permitted through said lip gasket, a sleeved piston in the other cylinder, an inlet passage to said other cylinder, an inlet passage to said other cylinder, said inlet passage being in communication with the space within the piston sleeve at all positions of the piston through a port in the sleeve of the piston, a spring within said sleeved piston for retracting said sleeved piston from said lip gasket, cam means engaging said sleeved piston for advancing it against said spring, and valve means within said sleeved piston and normally sealing the port therethrough against a supply of liquid under low pressure but permitting flow therethrough to fill said other cylinder under suction created by retractive movement of said sleeved piston under force of said spring.

4. A pump as defined by claim 3 in which the valve means within said sleeved piston is a cup-shaped resilient lipped member mounted within the bore of the piston about said coil spring and normally having its lip overlapping the port in the sleeve of the piston.

5. A pump for supplying cooling liquid under pressure to a brake, said pump comprising a plurality of cylinders, check valve means in one of said cylinders permitting passage of liquid under low pressure to one of said cylinders from a supply thereof, the other of said cylinders having an outlet for supplying liquid, each cylinder having a movable piston for displacing liquid, said pistons being connected for tandem operation, a rotatable cam intermittently engageable with one of said pistons for oscillating said pistons, a piston-engaging spring mounted in said one of said cylinders for biasing said pistons and valve means mounted between said cylinders controlling supply of liquid from the said one cylinder to said other cylinder, said valve means permitting flow only from said one cylinder toward said other cylinder and resisting any flow therethrough at pressure equal to or less than the pressure of said low pressure supply.

References Cited in the file of this patent

UNITED STATES PATENTS

| 544,864 | Olson | Aug. 20, 1895 |
| 987,313 | Meixner | Mar. 21, 1911 |
| 1,174,678 | Carpenter et al. | Mar. 7, 1916 |
| 1,589,246 | Scott | June 15, 1926 |
| 1,773,669 | Gerling | Aug. 19, 1930 |

FOREIGN PATENTS

| 409,579 | Italy | Feb. 22, 1945 |